United States Patent [19]
Dykes

[11] Patent Number: 5,955,842
[45] Date of Patent: Sep. 21, 1999

[54] DAYTIME HEADLIGHT SYSTEM

[76] Inventor: Jeffrey W. Dykes, 8427 29th St. Ct. E, Edgewood, Wash. 98371

[21] Appl. No.: 08/961,503

[22] Filed: Oct. 30, 1997

[51] Int. Cl.$^6$ ............................... B60Q 1/02; B60Q 1/04
[52] U.S. Cl. ............................... 315/82; 315/77; 307/10.8
[58] Field of Search ......................... 315/82, 77; 307/9.1, 307/10.8

[56] References Cited

U.S. PATENT DOCUMENTS

| | | | |
|---|---|---|---|
| 4,896,075 | 1/1990 | Earle | 315/82 |
| 4,985,660 | 1/1991 | Cronk | 315/82 |
| 5,027,001 | 6/1991 | Torbert | 315/82 |

*Primary Examiner*—Don Wong
*Assistant Examiner*—Wilson Lee

[57] ABSTRACT

A daytime headlight system is provided including a pair of conventional headlights mounted on a front of a vehicle. Each headlight has a high beam light adapted to emit light with a first intensity upon the receipt of a predetermined voltage. A low beam light is adapted to emit light with a second intensity lower than the first intensity upon the receipt of the predetermined voltage. Also included is a vehicular electrical system having a low beam terminal adapted to supply the predetermined voltage upon the receipt of a low beam signal generated by a user controlled switch within a cab of the vehicle. Associated therewith is a high beam terminal adapted to supply the predetermined voltage upon the receipt of a high beam signal generated by the user controlled switch. An ignition switch provided to supply the predetermined voltage upon the insertion of a key within an associated key hole and rotation thereof. The ignition switch continues to supply the predetermined voltage only while the key is situated within the key hole. Next provided is a control mechanism to effect the emission of light from the high beam lights upon the receipt of the predetermined voltage from the ignition switch and the lack of receipt of the predetermined voltage from vehicular electrical system.

4 Claims, 2 Drawing Sheets

DAYTIME HEADLIGHT SYSTEM

BACKGROUND OF THE INVENTION

1. Field of the Invention

The present invention relates to headlight control systems and more particularly pertains to a new daytime driving light for continuously illuminating the high beam lights of a vehicle in series during daytime driving to afford a safety feature.

2. Description of the Prior Art

The use of headlight control systems is known in the prior art. More specifically, headlight control systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art headlight control systems include U.S. Pat. No. 5,438,237; U.S. Pat. No. 5,245,251; U.S. Pat. No. 4,139,801; U.S. Pat. No. 5,382,877; U.S. Pat. No. 5,453,662; and U.S. Pat. No. Des. 346,671.

In these respects, the daytime driving light according to the present invention substantially departs from the conventional concepts and designs of the prior art, and in so doing provides an apparatus primarily developed for the purpose of continuously illuminating the high beam lights of a vehicle in series during daytime driving to afford a safety feature.

SUMMARY OF THE INVENTION

In view of the foregoing disadvantages inherent in the known types of headlight control systems now present in the prior art, the present invention provides a new daytime driving light construction wherein the same can be utilized for continuously illuminating the high beam lights of a vehicle in series during daytime driving to afford a safety feature.

The general purpose of the present invention, which will be described subsequently in greater detail, is to provide a new daytime driving light apparatus and method which has many of the advantages of the headlight control systems mentioned heretofore and many novel features that result in a new daytime driving light which is not anticipated, rendered obvious, suggested, or even implied by any of the prior art headlight control systems, either alone or in any combination thereof.

To attain this, the present invention generally comprises a pair of conventional headlights mounted on a front of a vehicle. Each headlight has a high beam light adapted to emit light with a first intensity upon the receipt of a predetermined voltage. Associated therewith is a low beam light adapted to emit light with a second intensity lower than the first intensity. Such emission is effected only upon the receipt of the predetermined voltage. Shown in FIG. 2 is a vehicular electrical system having a low beam terminal and a high beam terminal each adapted to supply the predetermined voltage upon the receipt of a low beam signal and a high beam signal, respectively. Such signals are generated by a user controlled switch within a cab of the vehicle. Next provided is an ignition switch adapted to supply the predetermined voltage upon the insertion of a key within an associated key hole and rotation thereof. It should be noted that the ignition switch continues to supply the predetermined voltage only while the key is situated within the key hole. Finally, control means, or more specifically relay means, is connected between the headlights, electrical system, and ignition switch. The relay means has a first mode of operation wherein the high beam lights are disconnected from the high beam terminal and further connected to the ignition switch in series. Such connection effects the emission of a light less than the first intensity. It should be understood that the relay means operates in the first mode only during the receipt of power from the ignition switch in combination with the lack of receipt of either beam signal by the vehicular electrical system. The relay means further has a second mode of operation wherein the high beam lights are disconnected from the ignition system and further connected to the high beam terminal in parallel for producing a light of the first intensity. The second mode is invoked only during the receipt of the high beam signal by the vehicular electrical system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new daytime driving light apparatus and method which has many of the advantages of the headlight control systems mentioned heretofore and many novel features that result in a new daytime driving light which is not anticipated, rendered obvious, suggested, or even implied by any of the prior art headlight control systems, either alone or in any combination thereof.

It is another object of the present invention to provide a new daytime driving light which may be easily and efficiently manufactured and marketed.

It is a further object of the present invention to provide a new daytime driving light which is of a durable and reliable construction.

An even further object of the present invention is to provide a new daytime driving light which is susceptible of a low cost of manufacture with regard to both materials and labor, and which accordingly is then susceptible of low prices of sale to the consuming public, thereby making such daytime driving light economically available to the buying public.

Still yet another object of the present invention is to provide a new daytime driving light which provides in the apparatuses and methods of the prior art some of the advantages thereof, while simultaneously overcoming some of the disadvantages normally associated therewith.

Still another object of the present invention is to provide a new daytime driving light for continuously illuminating the high beam lights of a vehicle in series during daytime driving to afford a safety feature.

Even still another object of the present invention is to provide a new daytime driving light that includes a pair of conventional headlights mounted on a front of a vehicle. Each headlight has a high beam light adapted to emit light with a first intensity upon the receipt of a predetermined voltage. A low beam light is adapted to emit light with a second intensity lower than the first intensity upon the receipt of the predetermined voltage. Also included is a vehicular electrical system having a low beam terminal adapted to supply the predetermined voltage upon the receipt of a low beam signal generated by a user controlled switch within a cab of the vehicle. Associated therewith is a high beam terminal adapted to supply the predetermined voltage upon the receipt of a high beam signal generated by the user controlled switch. An ignition switch provided to supply the predetermined voltage upon the insertion of a key within an associated key hole and rotation thereof. The ignition switch continues to supply the predetermined voltage only while the key is situated within the key hole. Next provided is a control mechanism to effect the emission of light from the high beam lights upon the receipt of the predetermined voltage from the ignition switch and the lack of receipt of the predetermined voltage from vehicular electrical system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
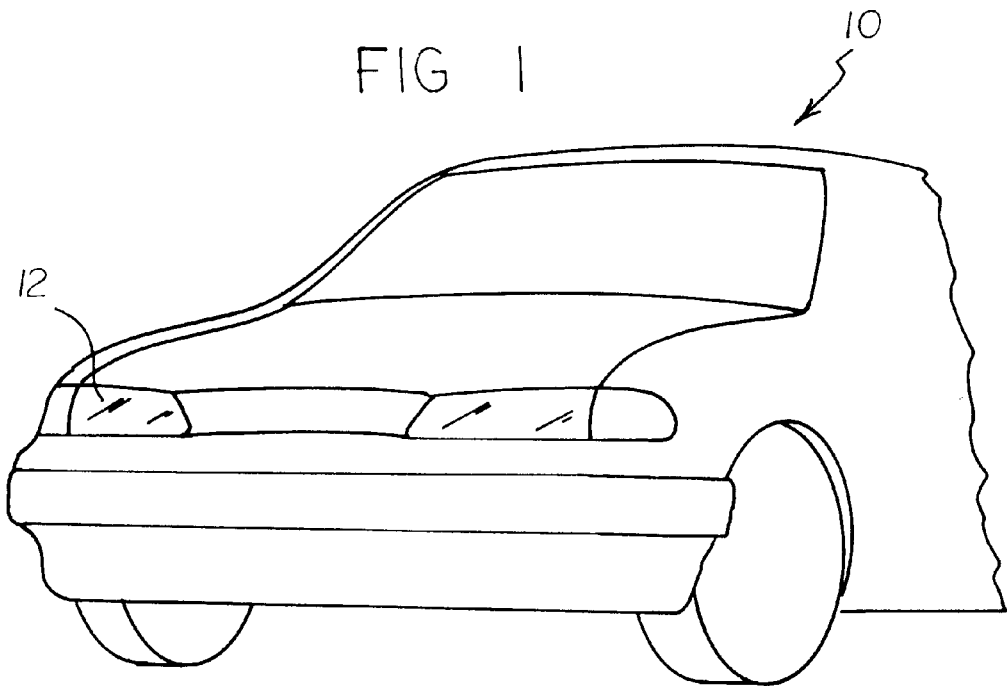
FIG. 1 is a perspective view of a new daytime headlight system according to the present invention.
Figure 2:
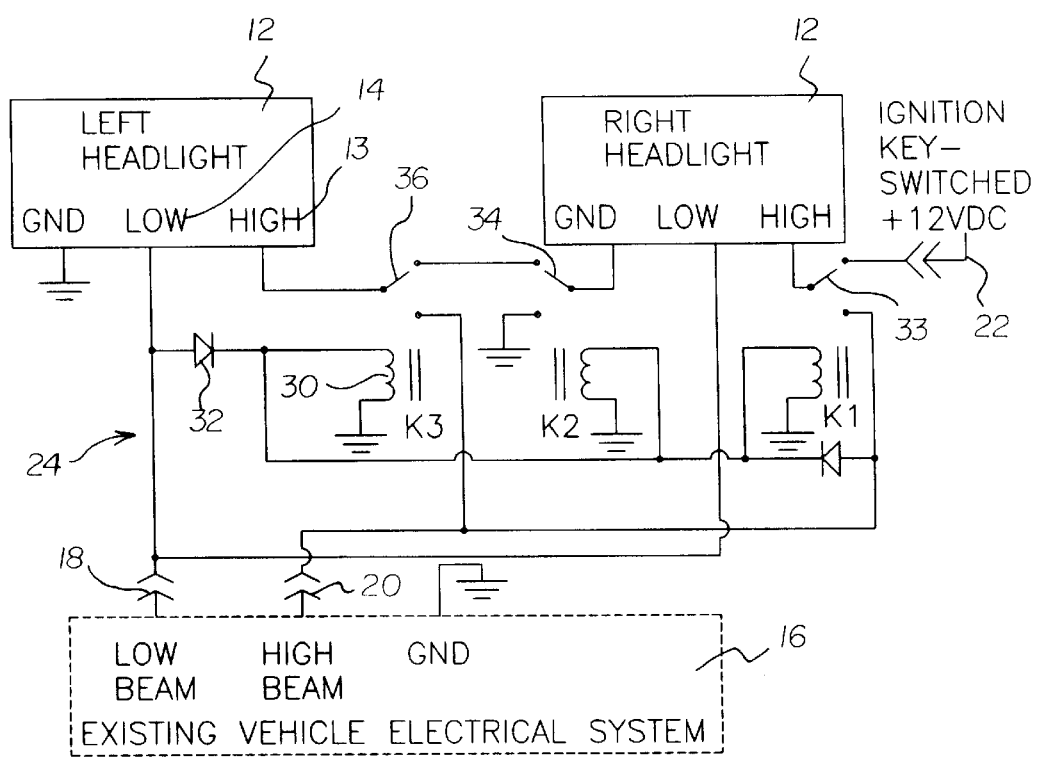
FIG. 2 is a schematic diagram of the present invention.

With reference now to the drawings, and in particular to FIGS. 1 through 2 thereof, a new daytime headlight system embodying the principles and concepts of the present invention and generally designated by the reference numeral 10 will be described.

The present invention, as designated as numeral 10, includes a pair of conventional headlights 12 mounted on a front of a vehicle. Each headlight has a high beam light 13 adapted to emit light with a first intensity upon the receipt of a predetermined voltage. Associated therewith is a low beam light 14 adapted to emit light with a second intensity lower than the first intensity. Such emission is effected only upon the receipt of the predetermined voltage.

Shown in FIG. 2 is a vehicular electrical system 16 having a low beam terminal 18 and a high beam terminal 20 each adapted to supply the predetermined voltage upon the receipt of a low beam signal and a high beam signal, respectively. Such signals are generated by a user controlled switch within a cab of the vehicle. The switch may take the form of a toggle switch or the like.

Next provided is an ignition switch 22 adapted to supply the predetermined voltage upon the insertion of a key within an associated key hole and rotation thereof. It should be noted that the ignition switch continues to supply the predetermined voltage only while the key is situated within the key hole. As such, the predetermined voltage is supplied by the ignition switch only when the car is running.

Finally, control means 24, or relay means, is connected between the headlights, electrical system, and ignition switch. The relay means has a first mode of operation wherein the high beam lights are disconnected from the high beam terminal and further connected to the ignition switch in series. Such connection effects the emission of a light less than the first intensity. It should be understood that the relay means operates in the first mode only during the receipt of power from the ignition switch in combination with the lack of receipt of either beam signal by the vehicular electrical system.

The relay means further has a second mode of operation wherein the high beam lights are disconnected from the ignition system and further connected to the high beam terminal in parallel for producing a light of the first intensity. The second mode is invoked only during the receipt of the high beam signal by the vehicular electrical system. It should be noted that the high beam lights are merely disconnected from the ignition system when the low beam signal is received.

To accomplish the foregoing functions, the control means includes a plurality of relay coils 30 each connected to the both terminals of the vehicular electrical system. A diode 32 is connected between the relay coils and the terminals. By this structure, each relay coil actuates upon the receipt of the predetermined voltage. Associated with each relay coil is a relay contact having an unbiased orientation and a biased orientation. Each relay contact transfers to the biased orientation only upon the actuation of the associated relay coil.

The relay contacts include a first contact 33 having a first terminal connected to the high beam light of a first headlight and a second terminal. Such second terminal has a biased orientation in communication with the high beam terminal and an unbiased orientation contacted to the ignition switch. A second contact 34 is provided having a first terminal and a second terminal with a biased orientation in communication with a ground terminal associated with the first head light and an unbiased orientation contacted to ground. A third contact 36 has a first terminal connected to the high beam light of a second head light. The third contact has a second terminal with a biased orientation in communication with the high beam terminal of the vehicular electrical system and an unbiased orientation contacted to the second terminal of the second contact.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A daytime headlight system comprising, in combination:

a pair of headlights mounted on a front of a vehicle, each headlight having a high beam light adapted to emit light with a first intensity upon the receipt of a predetermined voltage and a low beam light adapted to emit light with a second intensity lower than the first intensity upon the receipt of the predetermined voltage;

a vehicular electrical system having a low beam terminal adapted to supply the predetermined voltage upon the receipt of a low beam signal generated by a user controlled switch within a cab of the vehicle and a high beam terminal adapted to supply the predetermined voltage upon the receipt of a high beam signal generated by the user controlled switch;

an ignition switch adapted to supply the predetermined voltage upon the insertion of a key within an associated key hole and rotation thereof, wherein the ignition switch continues to supply the predetermined voltage only while the key is situated within the key hole; and relay means connected between the headlights, electrical system, and ignition switch, the relay means having a first mode of operation wherein the high beam lights are disconnected from the high beam terminal and further connected to the ignition switch in series for producing a light less than the first intensity only during the receipt of power from the ignition switch in combination with the lack of receipt of either beam signal by the vehicular electrical system, the relay means further having a second mode of operation wherein the high beam lights are disconnected from the ignition system and further connected to the high beam terminal in parallel for producing a light of the first intensity only during the receipt of the high beam signal by the vehicular electrical system.

2. A daytime headlight system comprising:

a pair of headlights mounted on a front of a vehicle, each headlight having a high beam light adapted to emit light with a first intensity upon the receipt of a predetermined voltage and a low beam light adapted to emit light with a second intensity lower than the first intensity upon the receipt of the predetermined voltage;

a vehicular electrical system having a low beam terminal adapted to supply the predetermined voltage upon the receipt of a low beam signal generated by a user controlled switch within a cab of the vehicle and a high beam terminal adapted to supply the predetermined voltage upon the receipt of a high beam signal generated by the user controlled switch;

an ignition switch adapted to supply the predetermined voltage upon the insertion of a key within an associated key hole and rotation thereof, wherein the ignition switch continues to supply the predetermined voltage only while the key is situated within the key hole;

control means connected between the headlights, electrical system, and ignition switch, the control means adapted to effect the emission of light from the high beam lights during the receipt of the predetermined voltage from the ignition switch and the lack of receipt of the predetermined voltage from the vehicular electrical system; and wherein the control means has a first mode of operation wherein the high beam lights are disconnected from the high beam terminal for producing a light less than the first intensity only during the receipt of the predetermined voltage from the ignition switch in combination with the lack of receipt of either beam signal by the vehicular electrical system, the control means further having a second mode of operation wherein the high beam lights are connected to the high beam terminal for producing a light of the first intensity only during the receipt of the predetermined voltage from the vehicular electrical system.

3. A daytime headlight system as set forth in claim 2 wherein the control means effects the emission of a light from the high beam lights which is less than the first intensity upon the lack of receipt of the high beam signal by vehicular electrical system.

4. A daytime headlight system as set forth in claim 3 wherein the control means effects the generation of the light of less than the first intensity by connecting the high beam in series.

* * * * *